US006845899B2

(12) United States Patent
Hessbrüggen et al.

(10) Patent No.: US 6,845,899 B2
(45) Date of Patent: Jan. 25, 2005

(54) METHOD AND DEVICE FOR MACHINING PARTS

(75) Inventors: Norbert Hessbrüggen, Eschenbach (DE); Ulrich Walter, Schlierbach (DE)

(73) Assignee: EMAG Maschinenfabrik GmbH, Salach (DE)

( * ) Notice: Subject to any disclaimer, the term of this patent is extended or adjusted under 35 U.S.C. 154(b) by 14 days.

(21) Appl. No.: 10/181,314

(22) PCT Filed: Jan. 16, 2001

(86) PCT No.: PCT/EP01/00433

§ 371 (c)(1),
(2), (4) Date: Jul. 17, 2002

(87) PCT Pub. No.: WO01/53033

PCT Pub. Date: Jul. 26, 2001

(65) Prior Publication Data

US 2003/0094480 A1 May 22, 2003

(30) Foreign Application Priority Data

Jan. 19, 2000 (DE) .......................... 100 02 053

(51) Int. Cl.[7] ........................ B23K 26/08; B23P 23/06
(52) U.S. Cl. ........................ 228/49.1; 219/121.63; 29/563; 29/33 P
(58) Field of Search ............... 29/563, 33 P, 33 R–650; 219/121.63, 121.64

(56) References Cited

U.S. PATENT DOCUMENTS 4,988,261 A * 1/1991 Blatt ........................ 414/749.1
5,107,910 A * 4/1992 Sasaki ........................ 144/48.1
5,123,161 A * 6/1992 Kubo et al. ................. 29/784
5,439,431 A * 8/1995 Hessbruggen et al. ........ 483/14
5,699,598 A * 12/1997 Hessbruggen et al. ...... 29/27 C
5,781,983 A * 7/1998 Gruner ........................ 29/563
6,122,824 A * 9/2000 Jensen .................... 29/888.023
6,298,531 B1 * 10/2001 Baumbusch et al. ........... 29/40

FOREIGN PATENT DOCUMENTS

DE          3912036 C1  * 7/1990
EP         0 885 686 A1 * 12/1998

* cited by examiner

Primary Examiner—Kiley S. Stoner
Assistant Examiner—Kevin McHenry
(74) Attorney, Agent, or Firm—Cohen, Pontani, Lieberman & Pavane

(57) ABSTRACT

At least one machine tool, preferably two machine tools (1, 2) is or are provided for the production of workpieces, or for the complete production of complex workparts, which machine tools each have a basic body (3, 4) and machine units (7, 8) movable in the horizontal direction thereon. Each machine unit has a work spindle (13, 14) which is supported displaceably in the axial direction of the spindle in a carrier (11, 12) of crankshaft-like design. The carrier is mounted pivotably and supports each work spindle above a respective transport system (31, 32) for a workpiece or the workparts (37, 38). Machining devices, for example in the form of a tool carrier (44) for turning, drilling and/or milling tools, a laser-welding device (46), a grinding device (47) and a brushing device (48), and also an apparatus for joining, are provided in the functional area of one of these machine tools.

32 Claims, 4 Drawing Sheets

METHOD AND DEVICE FOR MACHINING PARTS

PRIORITY CLAIM

This is a U.S. national stage of application No. PCT/EP01/00433, filed on Jan. 16, 2001. Priority is claimed on that application and on the following application: Country: Germany, Application No.: 100 02 053.4, Filed: Jan. 19, 2000.

BACKGROUND OF THE INVENTION

1. Field of the Invention

The invention relates to a method and an apparatus for the production of workpieces, in particular for the complete production of complex workparts.

2. Description of the Related Art

For the manufacture of workpieces, in particular workpieces with different successive machining steps, it has hitherto been necessary to rechuck the workpieces for the individual machining steps or, if appropriate, to transfer them to another machine tool, which increases the amount of work involved and is detrimental to precision.

For the manufacture of complex workparts, in other words assemblies made up of several parts, it is known to form the blanks of these workparts from a starting material by primary forming or reforming, so as then, via the procedural steps of separating, joining, coating and the operation for changing material properties, to bring about the final state and the material properties necessary for this. In this connection, special equipment in the form of machine tools is used for each of these procedural steps. The interlinking of the work operations on the individual machines is in this connection performed manually or automatically. In the case of manual linking, the amount of work involved is considerable, and, in the case of automatic linking, production lines with a considerable space requirement are frequently necessary.

SUMMARY OF THE INVENTION

It is an object of the invention to simplify production of workpieces and complete production of complex workparts with regard to both the amount of work involved and the space requirement of the machines to be used.

According to the invention, this object is achieved in a method for the production of workpieces by virtue of the fact that different machining devices can be used in the functional area of at least one multifunctional machine tool and the workpieces to be produced are brought into the most favorable position for machining by means of a machine unit with a work spindle of the machine tool, which spindle is pivotable and works according to the pick-up principle.

With regard to a method for the complete production of complex workparts, the object is achieved according to the invention by virtue of the fact that different machining devices can be used in the functional area of at least one multifunctional machine tool and the workparts to be produced, consisting of at least two workpieces, are brought into the most favorable position for the machining concerned by means of a machine unit with a work spindle of the machine tool, which spindle is pivotable and works according to the pick-up principle.

In this connection, a multifunctional machine tool is a machine in which, on account of the characteristics described, namely the possibility of working according to the pick-up principle and the pivotable arrangement of the work spindle, a workpiece, or an already assembled workpart, can be subjected to the most varied machining operations in very different positions. By virtue of the use of such a multifunctional machine tool, it is possible to bring the part to be machined into the most favorable position for the machining concerned. This is especially advantageous for the reason that, in this way, the machining devices can be designed simply and can also be used in a simple manner in the functional area of this machine tool, which encompasses both the stationary arrangement of such machining devices in the functional area of the machine tool and the movable use of such machining devices. It is likewise possible to design the work sequence more favorably.

According to the invention, an apparatus for the production of workpieces, in particular those in which several consecutive work steps are necessary, or for the complete production of complex workparts, which apparatus can serve in particular for implementing the methods explained above, has at least one multifunctional machine tool with a machine unit comprising a work spindle which is supported displaceably in the axial direction of the spindle, in a pivotably mounted carrier, for implementing the pick-up principle. The machine unit is arranged above a transport system for the workparts or workpieces and machining devices for the workpieces, and the machining devices are designed so as to be usable in the functional area of the work spindle.

In this connection, the work devices can be arranged in a stationary manner in the functional area of the machine tool or, according to another embodiment, the machining devices can be designed so as to be movable into the functional area of the machine tool.

According to a further embodiment of the invention, each machine unit can be moved in the horizontal direction transversely to the pivoting axis of the carrier for the work spindle. This embodiment widens considerably the applicability of the machine tool, the effect of this advantage being greater still in the variant with the machining devices which can be moved into the functional area of the machine tool.

A space-saving embodiment of the machine tool is achieved by virtue of the fact that the work spindle is designed as a motor spindle.

A further embodiment of the invention, in which the pivotably mounted carrier for the work spindle is of crankshaft-like design, is especially advantageous. This embodiment is particularly advantageous if the crank part is, in the vertical position of the work spindle, located above the bearing part of the carrier, because an especially high working area is then available under the work spindle.

An embodiment of the apparatus according to the invention which can find widespread application consists in that one machining device is designed as a tool carrier for receiving turning, drilling and/or milling tools. In this way, the most varied types of chip-removing machining of a workpiece or of an already assembled workpart can be carried out.

One machining device can furthermore be a grinding device.

An advantageous embodiment consists in that one machining device is a holding and positioning device for one of the parts to be joined together of a complex part to be manufactured and the work spindle, holding another part, serves for carrying out a joining operation or pressing operation. In this way, at least two parts of a complex workpart can be joined together within the functional area of the machine tool.

In order for it to be possible in addition, after a joining operation, for the individual parts of a complex part to be interconnected rigidly or for one of the parts to be hardened, it is advantageous if one machining device comprises a laser-welding device or laser-hardening device, as the connection operations and hardening operations can be carried out within the functional area of the machine tool, for which purpose it was hitherto necessary to produce the individual parts on very different machine tools.

It is also in accordance with the concentration of the various machining operations in the functional area of the machine tool if one machining device is a brushing device, so that the tools can be cleaned, for example after welding or hardening.

If the work spindle is also involved in a pressing operation in addition to a joining operation, it is advantageous, on account of the great forces arising in the process, which act on the bearing arrangement of the work spindle, if the work spindle can be clamped firmly in its carrier. In this way, it is possible to keep the great forces arising during the pressing operation away from the bearings of the work spindle. During the pressing operation, it is then necessary to provide the transport system with special devices, in order that the counterpressure can be taken up.

The machining possibilities in both the production of workpieces and the complete production of complex workparts can be increased by virtue of the arrangement of two machine tools. In the event of the arrangement of two machine tools, it can be advantageous if the basic bodies for receiving the movable machine units are arranged so as to be separate from one another with regard to the transmission of vibrations.

The invention is explained in greater detail below by means of a diagrammatically represented illustrative embodiment of an apparatus for the complete production of complex workparts.

DETAILED DESCRIPTION OF THE PRESENTLY PREFERRED EMBODIMENTS

Figure 1:
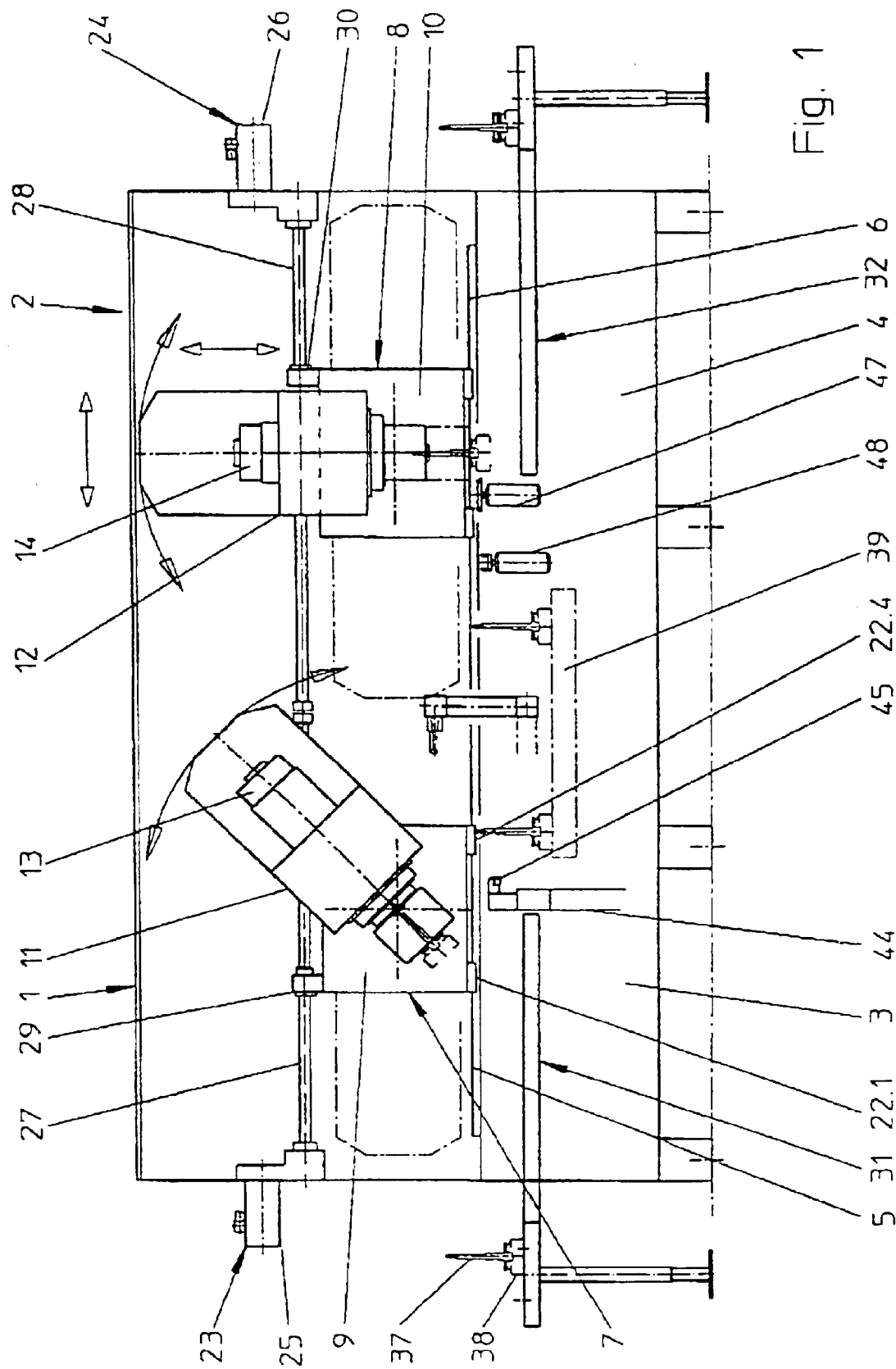
FIG. 1 shows a front view of an apparatus with two machine tools in different positions of the machine units of the machine tools concerned.
Figure 2:
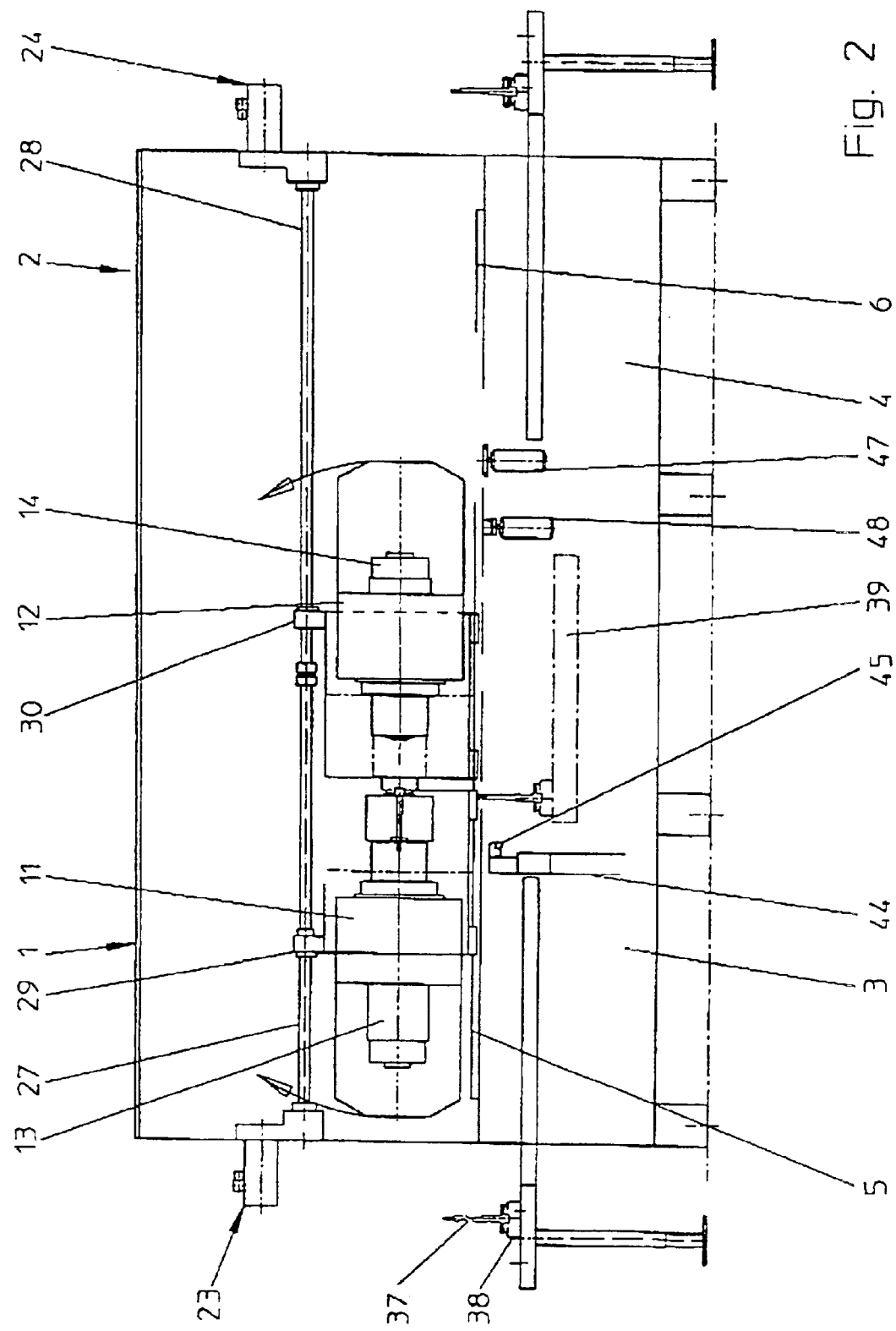
FIG. 2 shows an illustration corresponding to FIG. 1 with machine units pivoted into the horizontal position.

An apparatus for the production of workpieces or for the complete production of complex workparts, as is illustrated in FIGS. 1 to 4, comprises two machine tools 1 and 2 which each have a basic body 3 and 4, which bodies are separate from one another from the point of view of vibration. On each basic body, a guide track 5,6 is provided for the horizontal movement of a respective machine unit 7, 8. Each machine unit 7, 8 comprises a respective slide 9,10 which is movable on a respective guide track 5,6, and, mounted pivotably on each slide, a respective carrier 11,12 for a respective work spindle 13,14. In principle, however, it is also possible for only one machine tool with two machine units on a common basic body to be provided.

The carrier 11, 12 for each work spindle 13,14 is of crankshaft-like design and comprises a crank part 15, side cheeks 16, 17 and bearing journals 18, 19 which are supported pivotably in bearings 20, 21. By virtue of this carrier design, it is possible to pivot the machine unit 7 or 8 into any position, from the vertical position to the horizontal position. As can be seen in particular from FIG. 3, which shows an elevation of such a carrier 11, an advantageous embodiment is achieved by virtue of the fact that the crank part 15, which receives the work spindles 13 or 14, is, in the vertical position of the work spindle, located above the bearings 20, 21, so that a relatively high working area remains under the work spindle.

Figure 3:
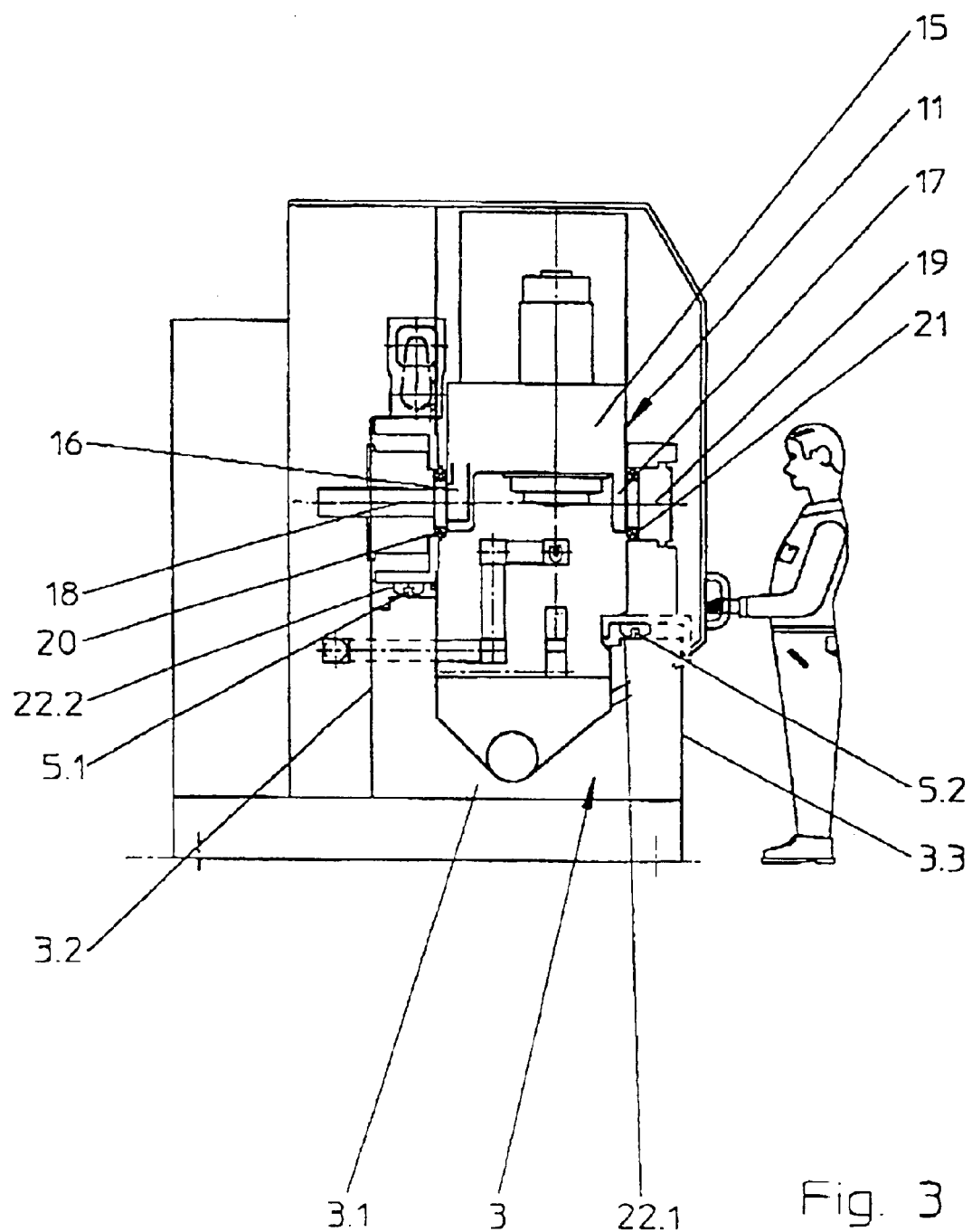
FIG. 3 shows an end view of the apparatus with the machine unit positioned vertically.
Figure 4:
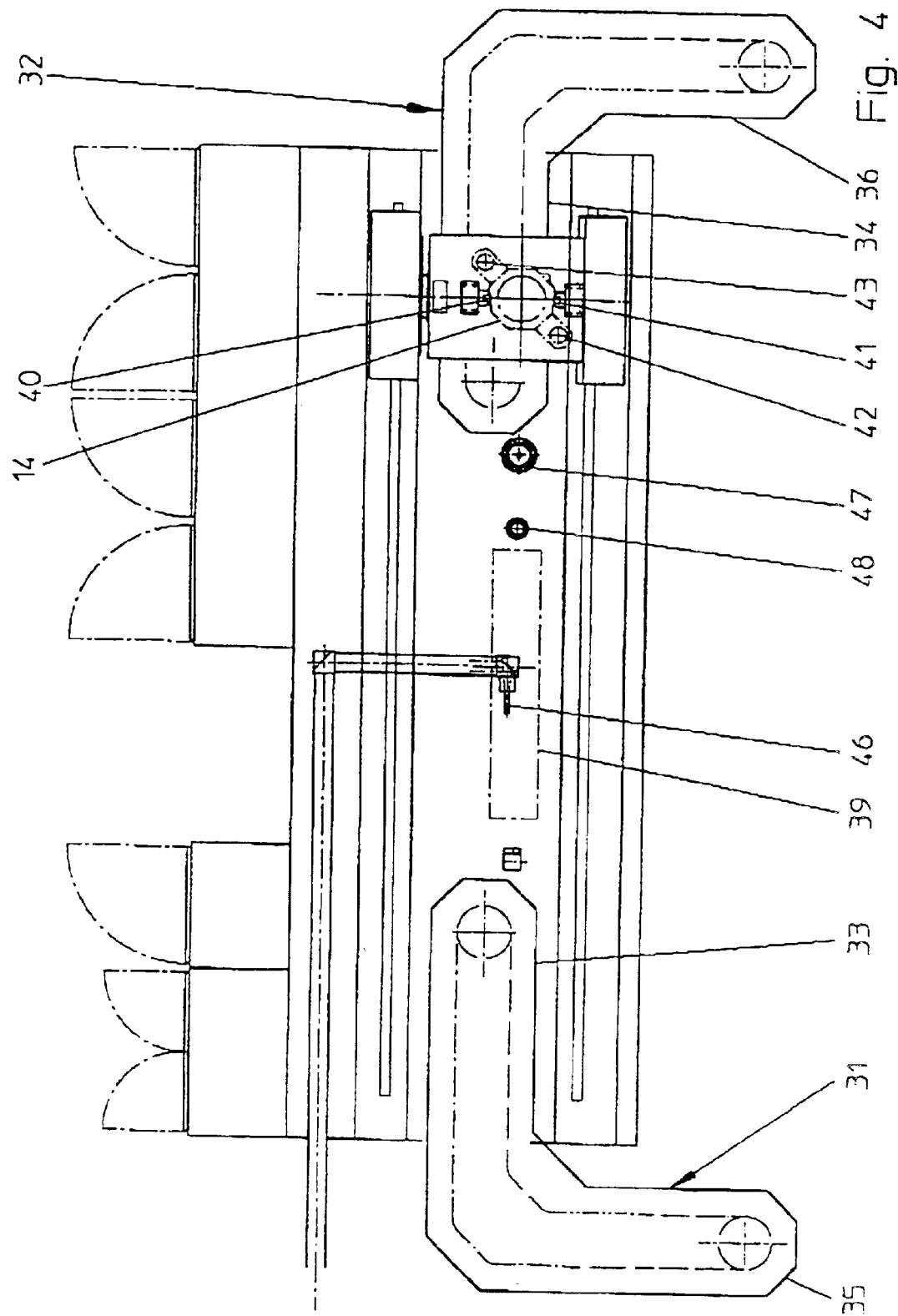
FIG. 4 shows a top view of an apparatus according to FIGS. 1 and 2, the left machine unit having been omitted.

As can be seen especially clearly from FIG. 3, the basic body 3 or 4 of each machine tool is of U-shaped design in cross section, the base part 3.1 being designed in the form of a trough conveyor for the chips generated, while the two upwardly directed legs 3.2 and 3.3 are of different length and bear, on their top side, guide rails 5.1 and, respectively, 5.2 of the guide track designated as a whole by 5. Resting on these guide rails are in total four guide carriages 22.1 to 22.4, of which only the guide carriages 22.1 and 22.2 can be observed in FIG. 3 and the guide carriages 22.1 and 22.4 can be observed in FIG. 1. These are in each case arranged on a respective slide 9,10 and serve for displacement of the slide in the horizontal direction. For displacing the slides 9 and 10, appropriate drives 23,24 are provided, which in each case comprise a servomotor 25,26, a ball screw spindle 27,28 and a corresponding nut 29,30, which are received in a holding arrangement of the slide 9 or 10 concerned.

Each machine tool is assigned a transport system 31, 32, which systems are arranged in an L-shape in a mirror-inverted manner in relation to one another. The long legs 33, 34 of the L-shaped transport system 31, 32 are in each case located under the guide tracks 5, 6. The short legs 35, 36, which are arranged transversely to the guide tracks, serve for receiving the individual workpieces, which can then be transported into the functional area of the machine tool concerned. As can be seen from FIGS. 1 and 2, a workpiece consisting of two parts 37 and 38 is provided on each transport system, which workpieces can be transferred from the transport systems 31, 32 concerned onto a conveyor belt 39 situated between the long legs 33 and 34, in particular by means of the work spindle 13 or 14, which is supported displaceably in the axial direction of the spindle and can consequently work according to the pick-up principle. It can be seen from FIG. 4 that the work spindle 14 is guided displaceably in the axial direction of the spindle by means of two guides 40 and 41 and that two symmetrically arranged ball screw spindles 42 and 43 serve for the displacement. The same guide and drive arrangement is also provided for the work spindle 13.

Various machining devices are provided in the functional area of the individual machine tools 1 and 2. Thus, in FIG. 1, for example, a tool carrier 44, which carries a turning tool 45, is indicated diagrammatically. This tool carrier can be designed as, for example, a tool turret and hold various turning, drilling and milling tools in a rigid or driven manner. A laser-welding or laser-hardening device 46 serves for welding the two parts 37 and 38 together or for hardening a further part still to be applied. A grinding device 47 and a brushing device 48 are provided for further machining operations. An apparatus for joining parts is not illustrated. All these machining devices, which are indicated only by way of example, can be either arranged in a stationary manner or designed so as to be movable, according to the requirements of the machining operations to be carried out.

What is claimed is:

1. An apparatus for the complete production of complex workpieces, said apparatus comprising:

a functional area, a plurality of machining devices in said functional area, a transport system for transporting workpieces to said functional area, at least one multi-functional machine tool having a machine unit arranged above the transport system and the machining devices, said machine unit comprising a carrier mounted for pivoting about a pivot axis and an axially displaceable work spindle mounted on said carrier, said spindle working according to the pick-up principle, said machine unit being movable in a horizontal direction transversely to the pivot axis of the carrier.

2. An apparatus as in claim 1 wherein the work spindle is a motor spindle.

3. An apparatus as in claim 1 wherein at least one of said machining devices is a tool carrier for receiving at least one of turning, drilling, and milling tools.

4. An apparatus as in claim 1 wherein at least one said machining device is a grinding device.

5. An apparatus as in claim 1 wherein one of said machining devices is one of a laser-welding device and a laser-hardening device.

6. An apparatus as in claim 1 wherein one of said machining devices is a brushing device.

7. An apparatus as in claim 1 wherein said work spindle can be firmly clamped to said carrier.

8. An apparatus as in claim 1 wherein at least one said machining device is a holding device for one of two workpieces to be joined together, said work spindle holding the other of said two workpieces.

9. An apparatus as in claim 1 comprising two said multi-functional machine tools, each said machine tools having a basic body for receiving one of said machine units, said basic bodies being isolated from each other with respect to transmission of vibrations.

10. An apparatus as in claim 1 wherein said machining devices are arranged in a stationary manner in the functional area.

11. An apparatus as in claim 1 wherein said machining devices are moveable into and out of said functional area.

12. An apparatus for the complete production of complex workpieces, said apparatus comprising:

a functional area, a plurality of machining devices in said functional area, a transport system for transporting workpieces to said functional area, at least one multi-functional machine tool having a machine unit arranged above the transport system and the machining devices, said machine unit comprising a carrier mounted for pivoting about a pivot axis and an axially displaceable work spindle mounted on said carrier, said spindle working according to the pick-up principle, wherein said carrier is designed like a crankshaft, comprising a crank part, two side cheeks, and two journals which are pivotably supported in bearing parts.

13. An apparatus as in claim 12 wherein said crank part is located above the bearing parts of the carrier when said work spindle is a in a vertical position.

14. An apparatus as in claim 12 comprising two said multi-functional machine tools, each of said machine tools having a basic body for receiving one of said machine units, said basic bodies being isolated from each other with respect to transmission of vibrations.

15. An apparatus as in claim 12 wherein said machining devices are arranged in a stationary manner in the functional area.

16. An apparatus as in claim 12 wherein said machining devices are moveable into and out of said functional area.

17. An apparatus as in claim 12 wherein the work spindle is a motor spindle.

18. Apparatus as in claim 12 wherein at least one of said machining devices is a tool carrier for receiving at least one of turning, drilling, and milling tools.

19. An apparatus as in claim 12 wherein at least one said machining device is a grinding device.

20. An apparatus as in claim 12 wherein one of said machining devices is one of a laser-welding device and a laser-hardening device.

21. An apparatus as in claim 12 wherein one of said machining devices is a brushing device.

22. An apparatus as in claim 12 wherein said work spindle can be firmly clamped to said carrier.

23. An apparatus for the complete production of complex workpieces, said apparatus comprising:

a functional area, a plurality of machining devices in said functional area, a transport system for transporting workpieces to said functional area, and at least one multi-functional machine tool having a machine unit arranged above the transport system and the machining devices, said machine unit comprising a carrier mounted for pivoting about a pivot axis and an axially displaceable work spindle mounted on said carrier, said spindle working according to the pick-up principle, wherein at least one said machining device is a holding device for one of two workpieces to be joined together, said work spindle holding the other of said two workpieces.

24. An apparatus as in claim 23 comprising two said multi-functional machine tools, each of said machine tools having a basic body for receiving one of said machine units, said basic bodies being isolated from each other with respect to transmission of vibrations.

25. An apparatus as in claim 23 wherein said machining devices are arranged in a stationary manner in the functional area.

26. An apparatus as in claim 23 wherein said machining devices are moveable into and out of said functional area.

27. An apparatus as in claim 23 wherein the work spindle is a motor spindle.

28. An apparatus as in claim 23 wherein at least one of said machining devices is a tool carrier for receiving at least one of turning, drilling, and milling tools.

29. An apparatus as in claim 23 wherein at least one said machining device is a grinding device.

30. An apparatus as in claim 23 wherein one of said machining devices is one of a laser-welding device and a laser-hardening device.

31. An apparatus as in claim 23 wherein one of said machining devices is a brushing device.

32. An apparatus as in claim 23 wherein said work spindle can be firmly clamped to said carrier.

* * * * *